US011738637B2

(12) United States Patent
Bulger et al.

(10) Patent No.: US 11,738,637 B2
(45) Date of Patent: Aug. 29, 2023

(54) FUEL PUMP COVER APPARATUS

(71) Applicants: NIFCO AMERICA CORP., Canal Winchester, OH (US); HONDA MOTOR CO., LTD., Tokyo (JP)

(72) Inventors: Christopher Keegan Bulger, Canal Winchester, OH (US); Jonathan Anthony Rihtar, Canal Winchester, OH (US); HyoJae Lee, Canal Winchester, OH (US)

(73) Assignees: NIFCO AMERICA CORP., Canal Winchester, OH (US); HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 17/521,099

(22) Filed: Nov. 8, 2021

(65) Prior Publication Data
US 2023/0140955 A1 May 11, 2023

(51) Int. Cl.
*B60K 15/03* (2006.01)
(52) U.S. Cl.
CPC .... *B60K 15/03* (2013.01); *B60K 2015/03243* (2013.01)

(58) Field of Classification Search
CPC .................. F02M 37/103; B60K 15/03; B60K 2015/03243; B60K 2015/03453; B60K 2015/03467
See application file for complete search history.

(56) References Cited

U.S. PATENT DOCUMENTS

| 2005/0194796 A1* | 9/2005 | Powell ................. F02M 37/103 220/298 |
| 2012/0187131 A1* | 7/2012 | Claucherty ............ B60K 15/03 220/315 |
| 2017/0087979 A1* | 3/2017 | Beauchaine ........... B60K 15/01 |
| 2019/0234357 A1* | 8/2019 | Aponte Hernandez ...................... B60K 15/03 |

* cited by examiner

*Primary Examiner* — Stephen J Castellano
(74) *Attorney, Agent, or Firm* — Manabu Kanesaka

(57) ABSTRACT

A fuel pump cover apparatus includes a fuel pump assembly configured to be attached to a fuel tank, and a lock ring disposed on the fuel pump assembly configured to fix the fuel pump assembly to the fuel tank and having a plurality of slots. A cover ring is placed over the lock ring and includes a plurality of clipping devices disposed under the cover ring to be attached to the slots of the lock ring, and spring retainers disposed under the cover ring to apply pressure between the cover ring and the fuel pump assembly. A cover is disposed over the cover ring to cover the fuel pump assembly, and a plurality of retaining members is arranged between the cover and the cover ring to removably attach the cover to the cover ring.

6 Claims, 10 Drawing Sheets

FUEL PUMP COVER APPARATUS

BACKGROUND OF THE INVENTION

The present invention relates to a fuel pump cover apparatus.

In the current configuration of an internal combustible engine, a fuel pump is situated within a fuel tank. In particular, the fuel pump is inserted through an open port in an upper portion of the fuel tank. On the other hand, the location and the shape of the fuel tank arranged inside the vehicle are determined by a frame and a body shape of the vehicle. In some cases, an upper portion of the fuel tank has a recessed area for locating the fuel pump, and this may cause a problem in approaching the fuel pump and other element in the recessed area.

The present invention has been made to obviate a problem of the conventional fuel pump cover, and the purpose of the present invention is to provide a fuel pump cover to restrict access to the fuel pump. Other objects and advantages of the invention will be apparent from the following description of the invention.

SUMMARY OF THE INVENTION

In order to attain the object, a fuel pump cover apparatus of the invention comprises a fuel pump assembly configured to be attached to a fuel tank; a lock ring disposed on the fuel pump assembly configured to fix the fuel pump assembly to the fuel tank and having a plurality of slots; a cover ring placed over the lock ring and having a plurality of clipping devices disposed under the cover ring to be attached to the slots of the lock ring, and a plurality of spring retainers disposed under the cover ring to apply pressure between the cover ring and the fuel pump assembly; a cover disposed over the cover ring to cover the fuel pump assembly; and a plurality of retaining members arranged between the cover and the cover ring to removably attach the cover to the cover ring.

In the fuel pump cover apparatus, the cover can be removably attached to cover ring to cover the fuel pump assembly. After the cover is removed from the fuel pump assembly, the fuel pump assembly or other parts are accessible for maintenance. After completion of the maintenance, the cover can be attached to the cover ring again.

In the fuel pump cover apparatus, since the plurality of spring retainers is disposed under the cover ring, the cover ring can be fixed to the lock ring with a certain pressure. Thus, the cover ring is not accidentally detached from the lock ring.

In the invention, each of the plurality of retaining members includes a retaining pin projecting from an upper surface of the cover ring, and a hole formed in the cover to removably receive the retaining pin. Thus, the cover can be removably attached to the cover ring.

In the invention, each of the clipping devices includes a lock retainer engaging each of edge lips of the lock ring to engage the cover ring with the lock ring. Also, the cover ring further includes access ports to release the plurality of clipping devices from the lock ring, and a plurality of retainer guides disposed under the cover ring, each having a guide angle that compresses each of the spring retainers during installation. In this structure, the cover ring can be easily attached to and detached from the lock ring by rotating the cover ring over the lock ring.

Further, the cover ring includes a position indicator that shows whether the cover ring is rotationally locked or unlocked to the securing member that retains the fuel pump assembly.

In the invention, the cover can be secured to the fuel tank by means of the cover ring through the lock ring that holds the fuel pump assembly to the fuel tank. The cover attached to the cover ring can be released for removal and reused for assembly to allow for service of the fuel pump.

DETAILED DESCRIPTION OF THE INVENTION

The selected embodiments will be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
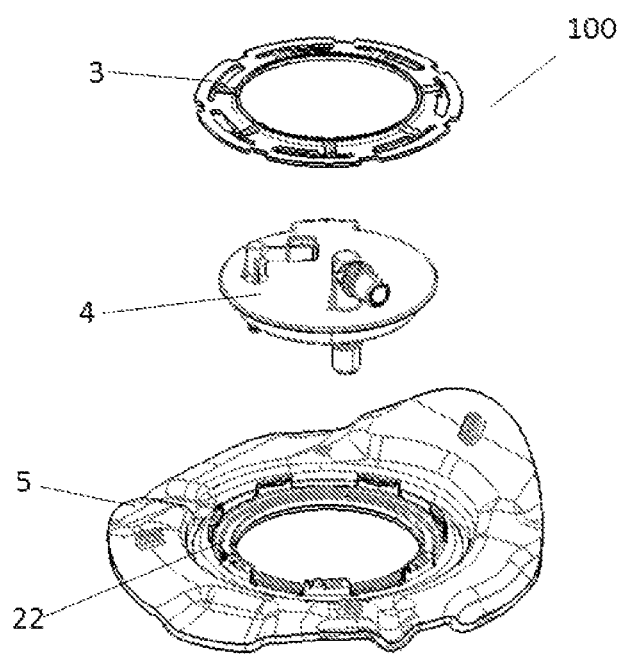
FIG. 1 shows an exploded isometric view of a conventional fuel pump assembly and a lock ring.

As shown in FIG. 1, a fuel pump installation assembly 100 is illustrated to define the current assembly process used in existing internal combustible engine vehicle as a comparison to the embodiment of the invention. A fuel pump 4 is placed into an insert ring 22 that is pre-molded into a fuel tank 5. With the fuel pump in place, the lock ring 3 is locked over the fuel pump assembly 4, securing it to the fuel tank 5. This structure leaves the fuel pump 4 exposed to any elements that can access the top of the fuel tank 5.

Figure 2:
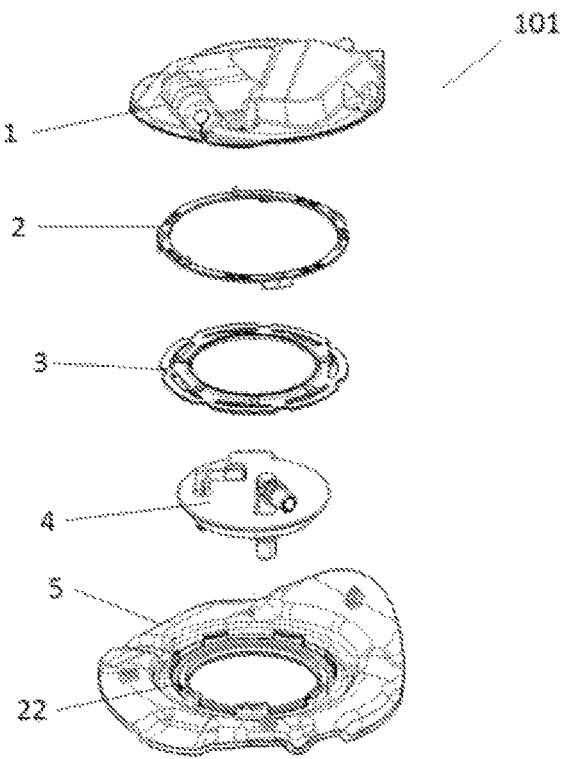
FIG. 2 shows an exploded isometric view of the fuel pump with fuel pump cover and fuel pump cover ring of the present invention.
Figure 3:
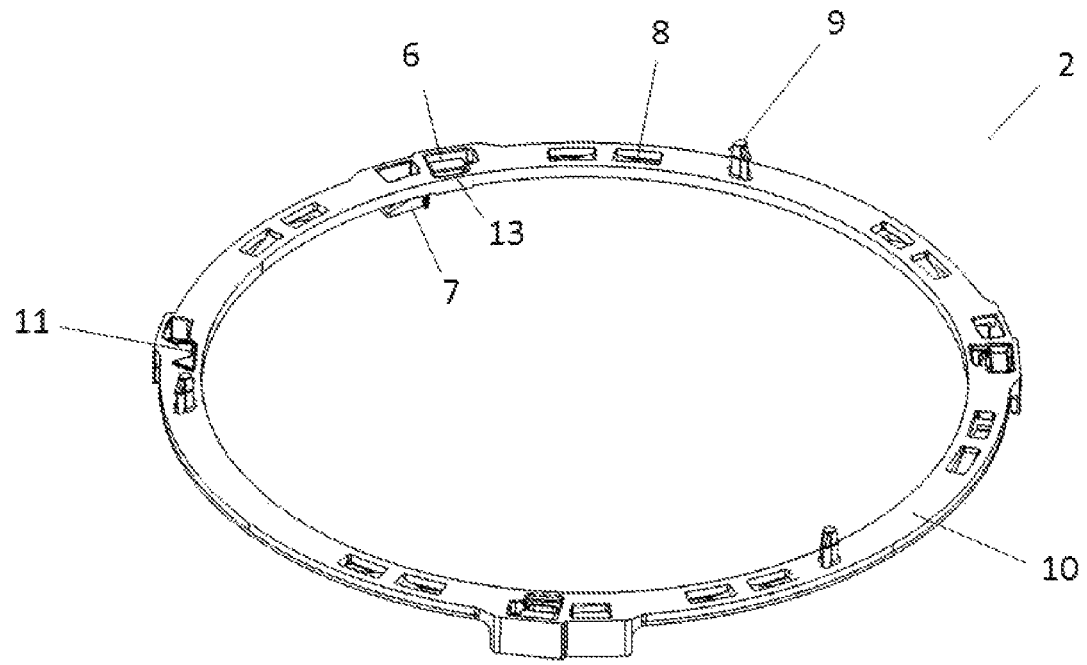
FIG. 3 shows a top side isometric view of the fuel pump cover ring.
Figure 4:
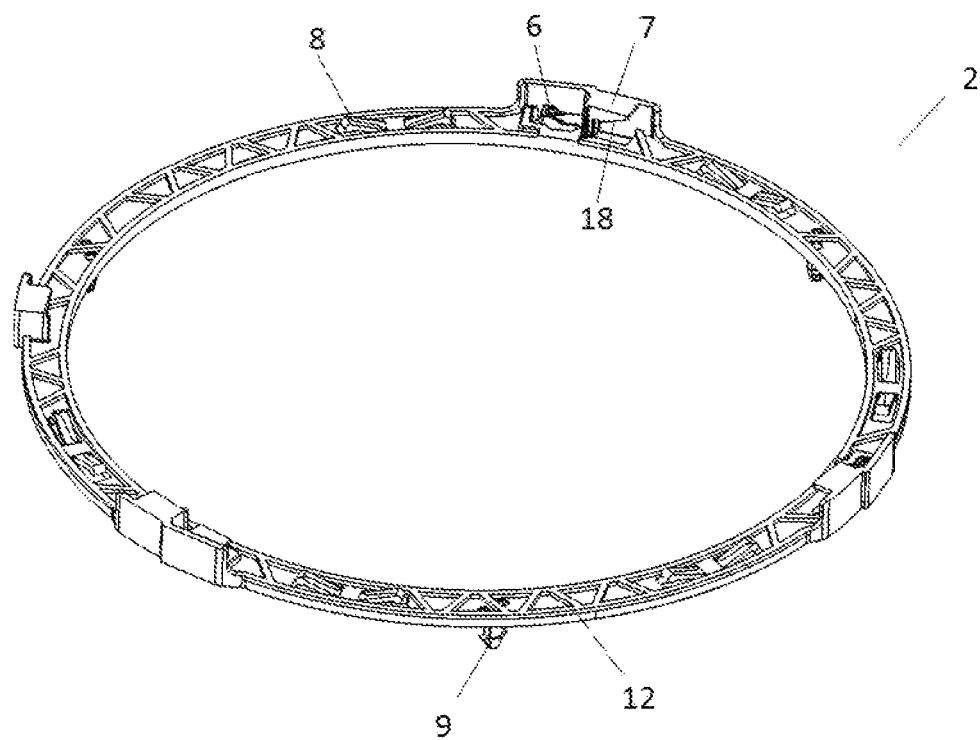
FIG. 4 shows a bottom side isometric view of the fuel pump cover ring.
Figure 5:
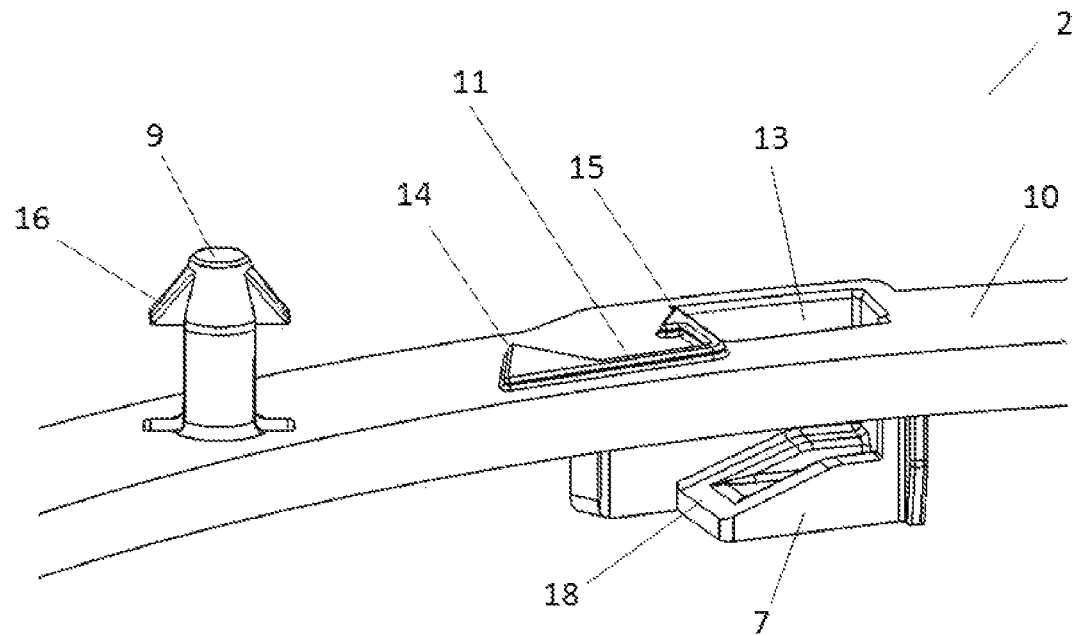
FIG. 5 shows a partial detailed top side view of the fuel pump cover ring.
Figure 6:
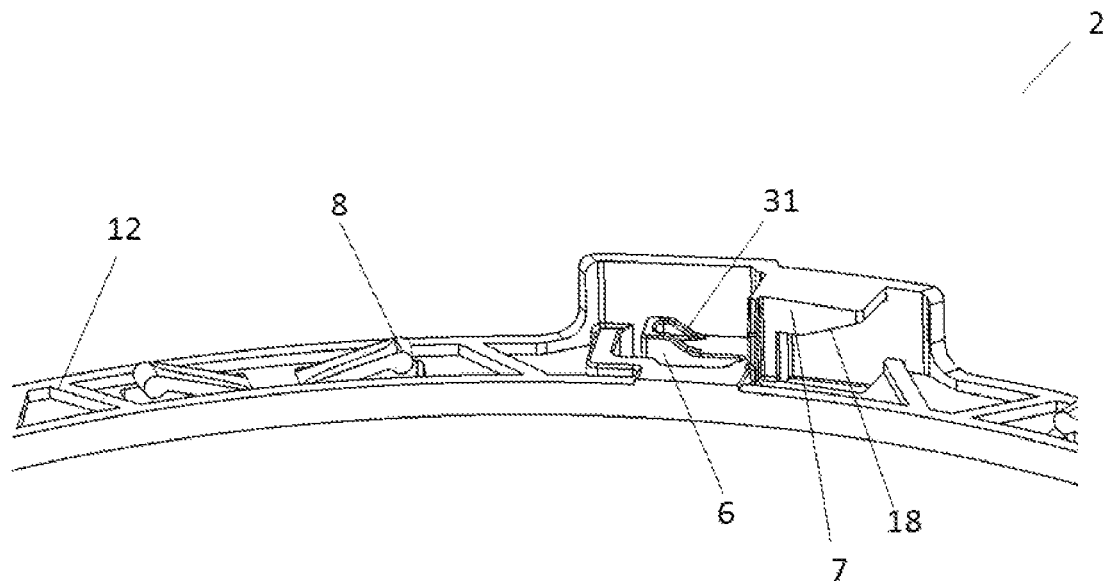
FIG. 6 shows a partial detailed bottom side view of the fuel pump cover ring.

FIG. 2 shows a fuel pump installation assembly 101 of the invention, wherein the fuel pump installation assembly 100 as explained above, which is used in existing internal combustible engine vehicle is combined with the embodiment of the invention. The fuel pump assembly 4 is placed into the insert ring 22 that is pre-molded into the fuel tank 5. With the fuel pump assembly 4 in place, the lock ring 3 is locked over the fuel pump assembly 4 securing it to the fuel tank 5. With the fuel pump assembly 4 secured to the fuel tank 5, the fuel pump cover ring 2 is installed onto the lock ring 3. The flexible cover 1 is then installed onto the fuel pump cover ring 2. The embodiment will restrict access to the fuel pump assembly 4 from any elements that can access the top of the fuel tank 5.

Figure 10:
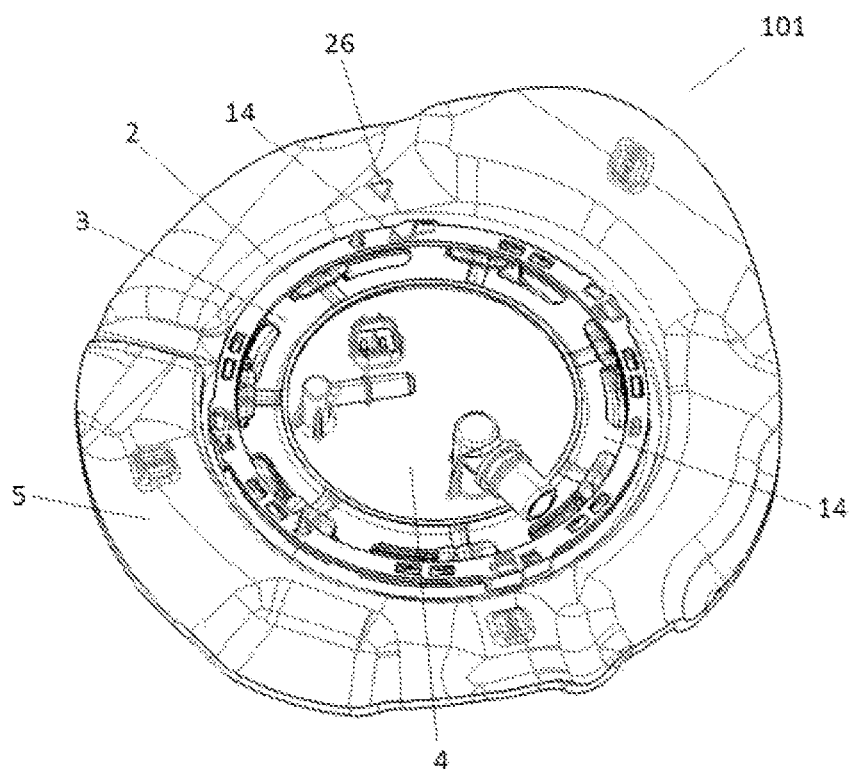
FIG. 10 shows an isometric view of the fuel pump cover ring aligned to the lock ring in the unlocked position.
Figure 11:
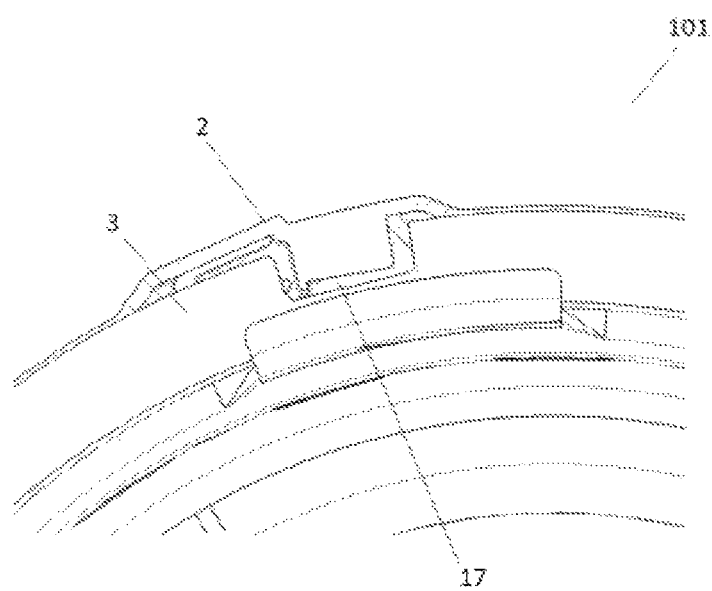
FIG. 11 shows a partial bottom view (looking from the inside of the fuel tank) of the fuel pump cover ring aligned to the lock ring in the unlocked position.
Figure 12:
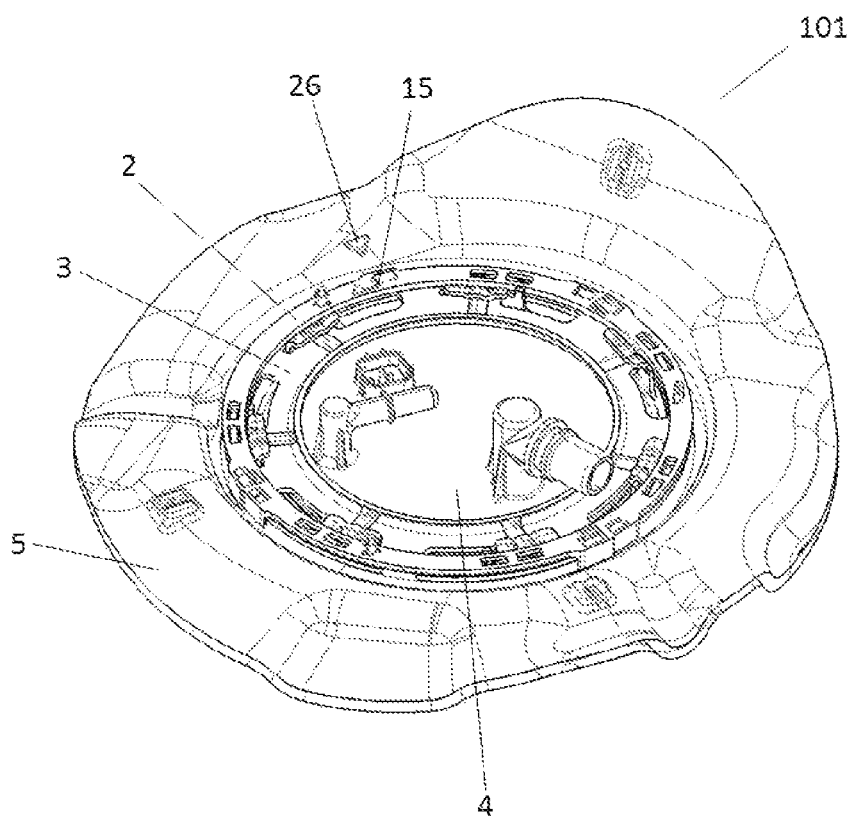
FIG. 12 shows an isometric view of the fuel pump cover ring assembled to the lock ring in the locked position.
Figure 13:
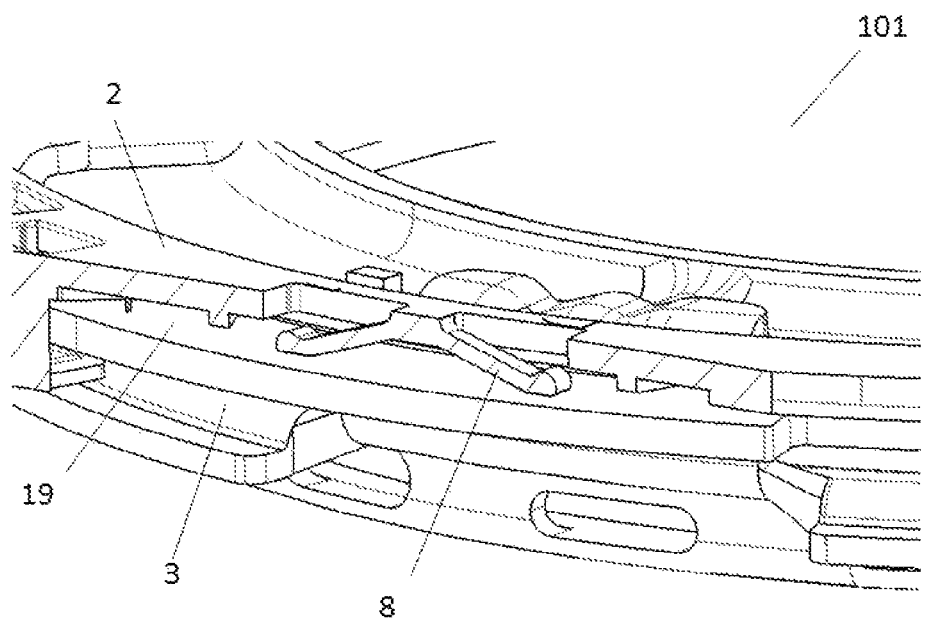
FIG. 13 shows a partial detailed section fuel pump cover ring aligned to the lock ring in the locked position.
Figure 14:
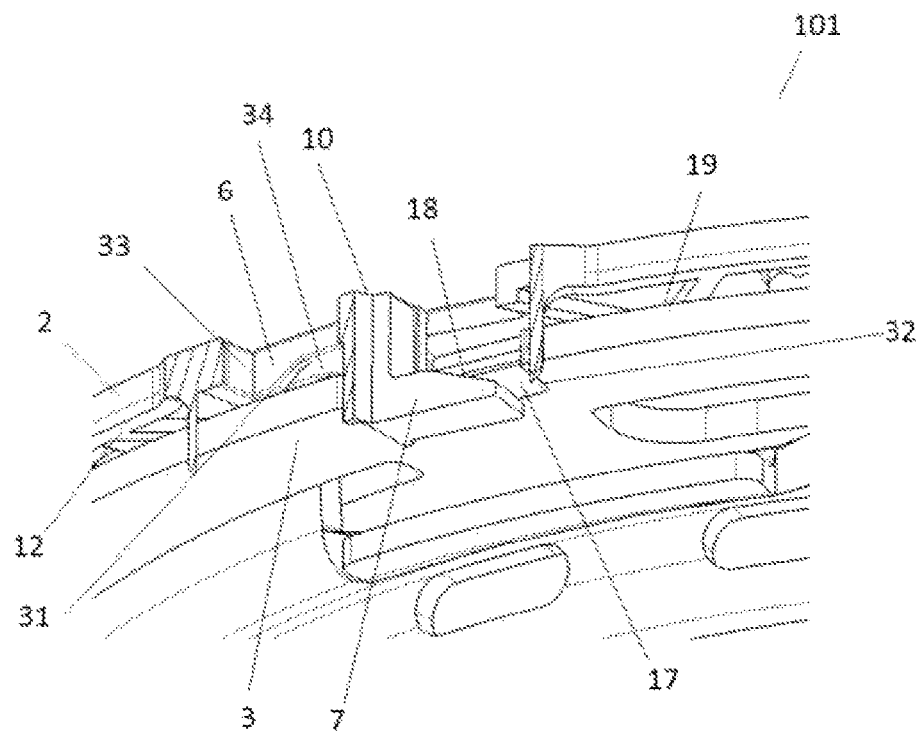
FIG. 14 shows a partial detailed section of the fuel pump cover ring aligned to the lock ring in the unlocked position.
Figure 15:
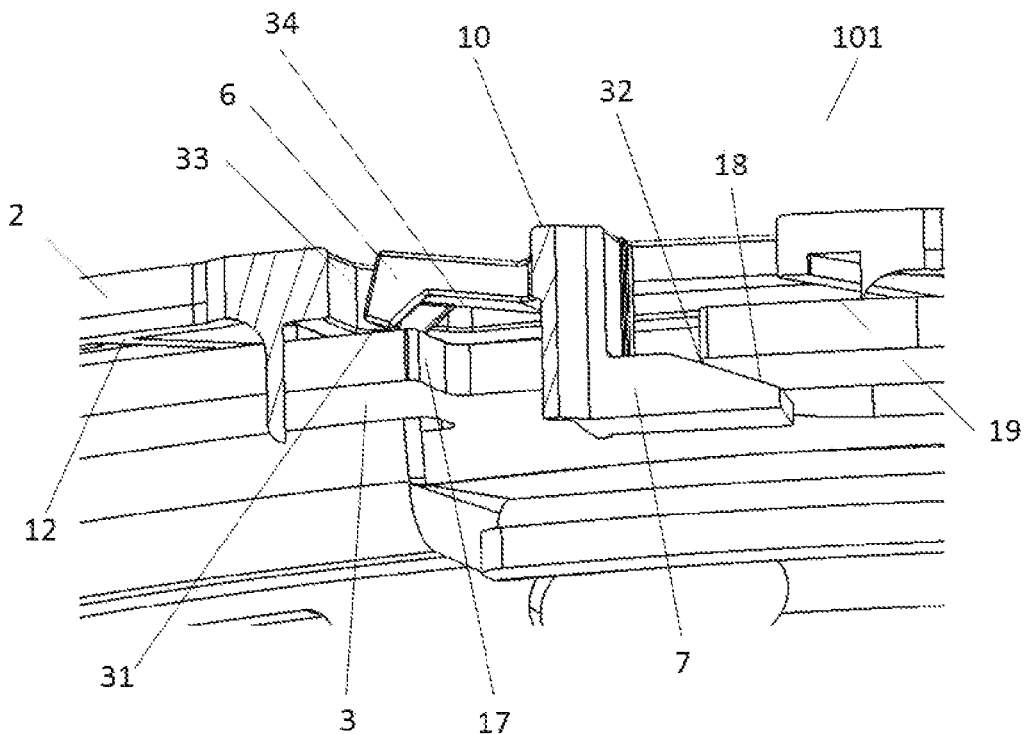
FIG. 15 shows a partial detailed section of the fuel pump cover ring aligned to the lock ring in the unlocked position being rotated for assembly.
Figure 16:
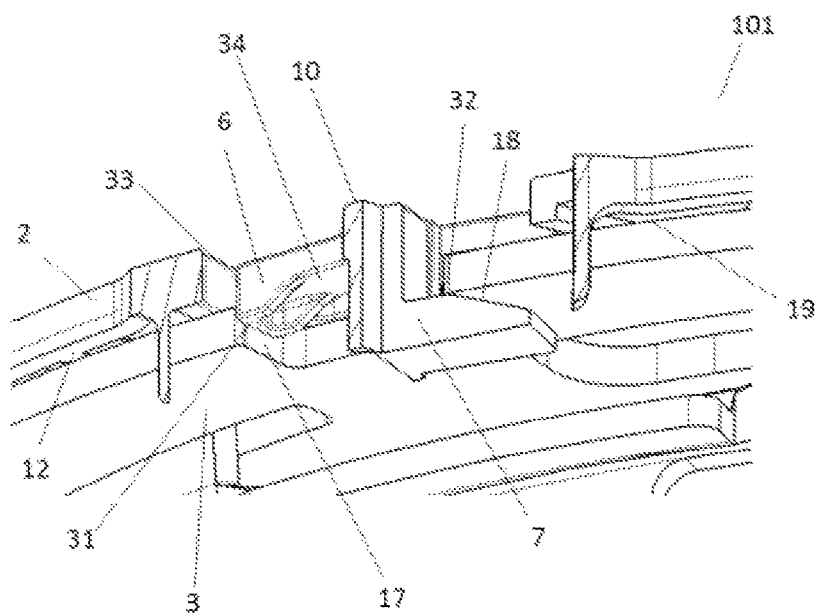
FIG. 16 shows a partial detailed section of the fuel pump cover ring aligned to the lock ring in the locked position.
Figure 17:
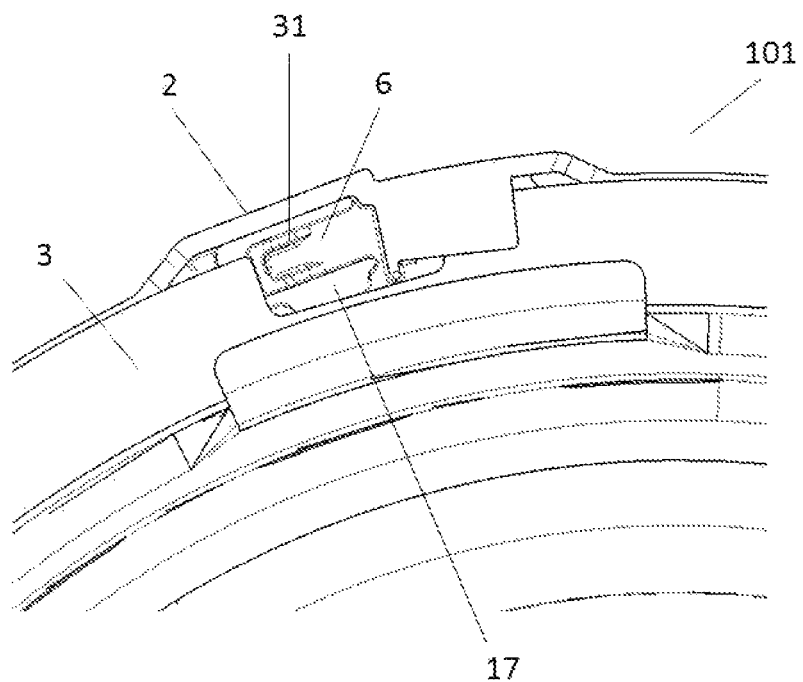
FIG. 17 shows a partial detailed section of the fuel pump cover ring in the locked position.
Figure 18:
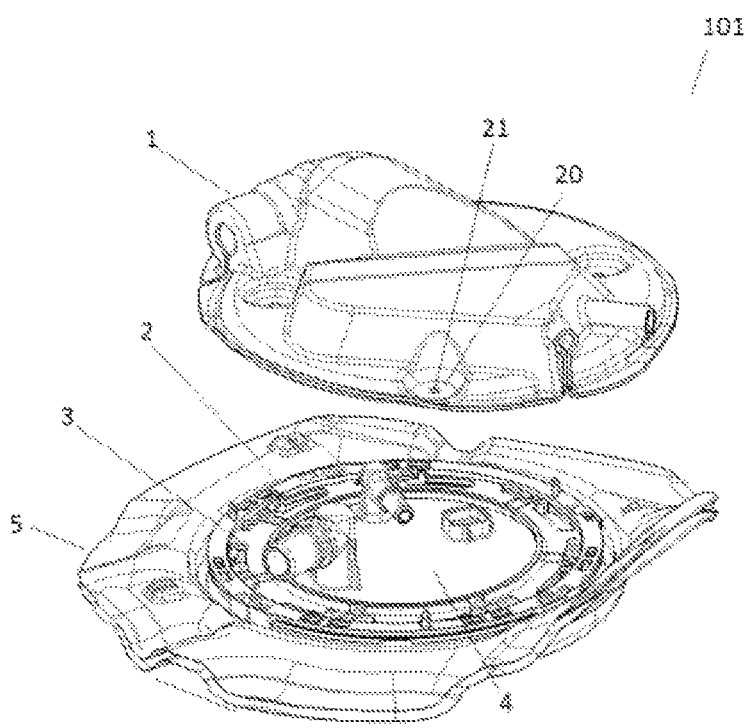
FIG. 18 shows an isometric view of the flexible fuel pump cover being assembled to the fuel pump cover ring.

As shown in FIG. 3 thru FIG. 7, the fuel pump cover ring 2 comprises snap lock retainers 6, retainer guides 7, spring retainers 8, retaining pins 9, and position indicator 11. The snap lock retainers 6 lock the fuel pump cover ring 2 to the lock ring 3. The retainer guides 7 position the snap lock retainers 6 into lock ring slots 17 on the lock ring 3. The spring retainers 8 maintain consistent pressure between the fuel pump cover ring 2 and the lock ring 3 to eliminate part rattle. The retaining pins 9 secure the flexible cover 1 to the fuel pump cover ring 2. The position indicator 11 includes two indicator arrows. The lock arrow indicator 15 and the unlocked arrow indicator 14 align to the install arrow 26 (FIG. 10) located on the fuel tank 5 during installation and removal of the fuel pump cover ring 2.

Figure 7:
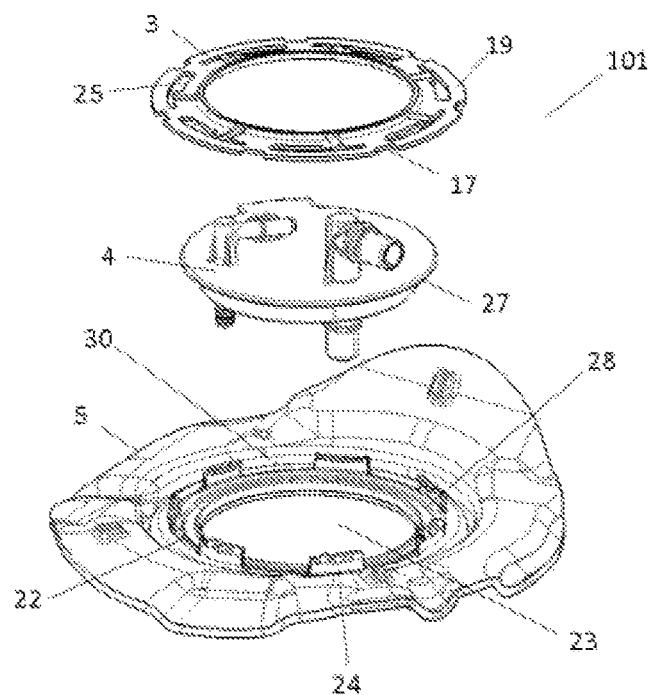
FIG. 7 shows an exploded isometric view of the fuel pump being assembled to the fuel tank.
Figure 8:
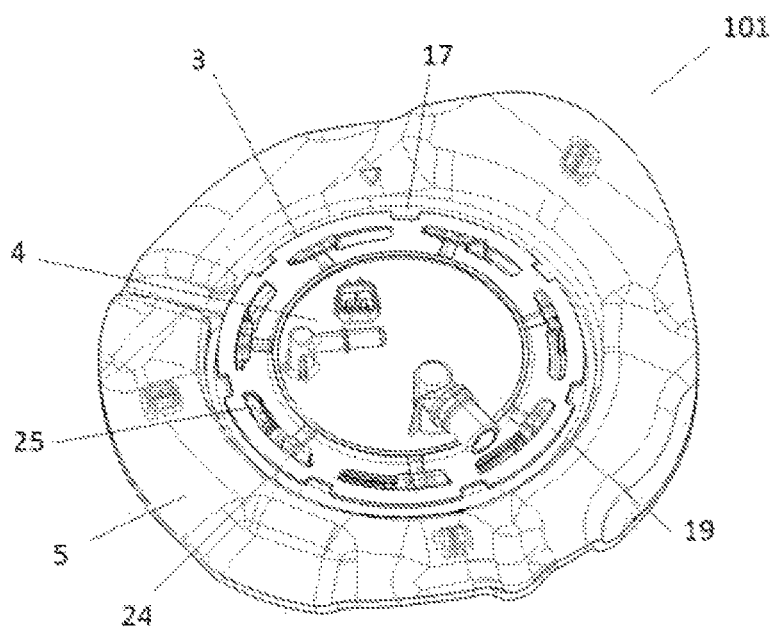
FIG. 8 shows an isometric view of the fuel pump assembled to the fuel tank.
Figure 9:
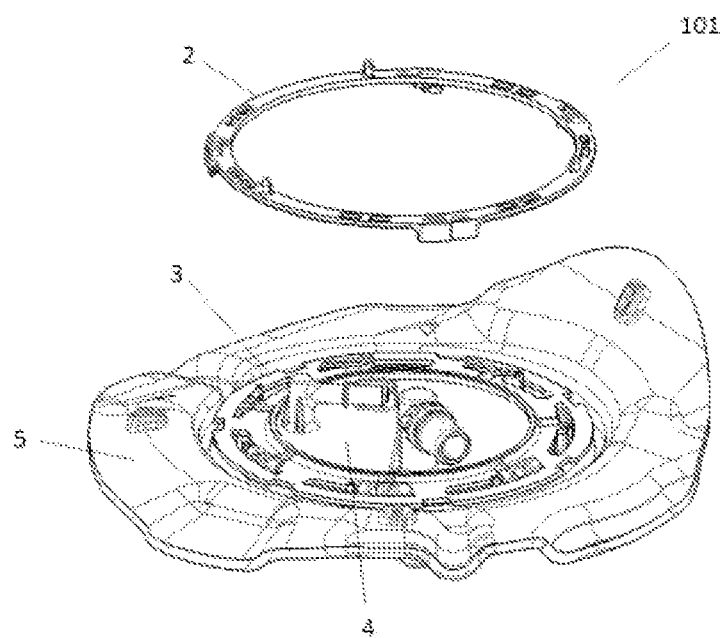
FIG. 9 shows an exploded isometric view of the fuel pump cover ring being assembled to the lock ring.

In assembling the fuel pump assembly process, as shown in FIG. 7 thru FIG. 8, the fuel pump assembly 101 process begins when the fuel pump 4 is placed into the insert ring 22 that is pre-molded into the fuel tank 5. The insert ring 22 encompasses the perimeter of the access port 23 allowing the fuel pump assembly 4 to be located within the fuel tank 5. The fuel pump 4 is placed into the insert ring 22, mating the bottom surface 27 of the fuel pump assembly 4 to the top surface 28 of the insert ring 22.

With the fuel pump assembly 4 in place, the lock ring 3 is placed over the fuel pump assembly 4 engaging the lock ring inner slots 25 of the lock ring 3 with the insert ring tabs 24 of the insert ring 22. Rotating the lock ring 3, the insert ring tabs 24 pop into place retaining the cam lock ring slots 25 and compressing the fuel pump 4 between the lock ring 3 and the insert ring 22 securing it to the fuel tank 5.

As shown in FIG. 9 through FIG. 14, with the fuel pump assembly 4 secured to the fuel tank 5, the fuel pump cover ring 2 is placed on top of the lock ring 3. The unlocked arrow indicator 14 on the fuel pump cover ring 2 is aligned to the install arrow 26 on the fuel tank 5 (see FIG. 10). When the arrows are aligned, the retainer guides 7 are located within the cam lock ring outer slots 17 in the lock ring 3 (see FIG. 11).

Pressure is then applied equally around the top surface 10 of the fuel pump cover ring 2, compressing the spring retainers 8 (See FIG. 13) until the bottom surface 12 of the fuel pump cover ring 2 contacts the top surface 19 (see FIG. 14) of the lock ring 3. The fuel pump cover ring 2 is then rotated until the locked arrow indicator 15 is aligned with the install arrow 26 on the fuel tank 5 (see FIG. 12).

As shown in FIG. 14 thru FIG. 17, while the fuel pump cover ring 2 is being rotated into the locked position, the angled surface 18 of the retainer guide 7 slides under the edge lip 32 of the lock ring 3 which in turn pulls the bottom surface 12 of the fuel pump cover ring 2 towards the top surface 19 of the lock ring 3, pushing the bottom surface 31 of the snap lock retainer 6 against the top surface 19 of the lock ring 3. This forces the snap lock retainer 6 to flex upwards towards the top surface 10 of the fuel pump cover ring 2 (see FIG. 15). Once the locked arrow indicator 15 on the fuel pump cover ring 2 is aligned with the install arrow 26 on the fuel tank 5, the snap lock retainers 6 will flex back to its original position and dropping into the cam lock ring outer slot 17 (see FIG. 17).

With the retainer surface 33 of the fuel pump ring cover 2 now lower than the cam lock ring outer slot 17 (see FIG. 16), the fuel pump cover ring can no longer be rotated in reverse to remove it from the lock ring 3 without a tool. The spring retainer 8 will remain partially compressed against the top surface 19 of the lock ring 3 to maintain a constant pressure to keep the fuel pump cover ring 2 from rattling.

Figure 19:
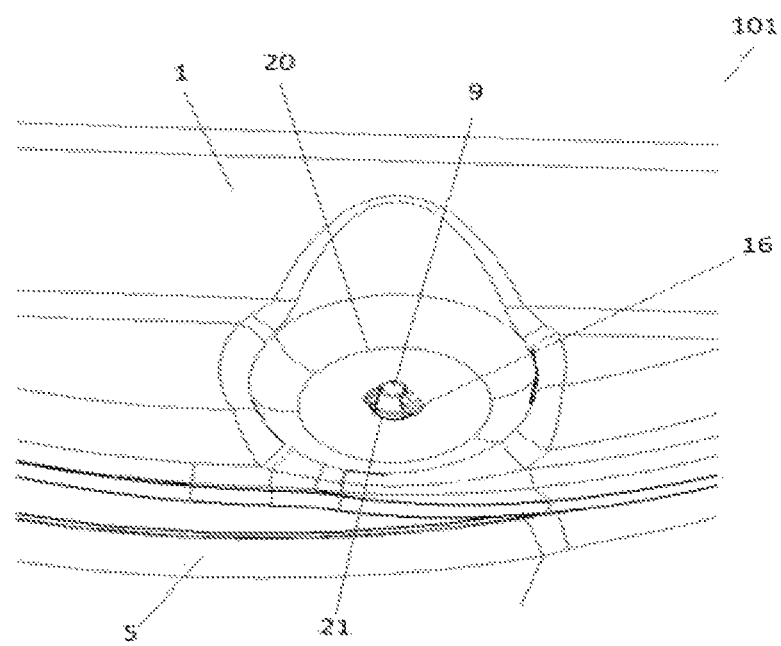
FIG. 19 shows a partial detailed section of the flexible fuel pump cover assembled to the fuel pump cover ring.

As shown in FIG. 19, with the fuel pump cover ring 2 secured to the lock ring 3, the flexible cover 1 is installed. The mounting hole 21 of the flexible cover 1 is aligned with the retaining pin 9 on the fuel pump cover ring 2. Pressure is then applied to the recessed area 20 around the mounting hole to push the retaining pin 9 through the mounting hole 21. The retaining pin barb 16 located on the end of the retaining pin 9 secures the flexible cover 1 to the fuel pump cover ring 2.

When the flexible cover 1 and the fuel pump cover ring 2 are removed to service the fuel pump assembly 4, the flexible cover 1 can be removed by working the mounting holes 21 of the flexible cover 1 over the retaining pin 9 of the fuel pump cover ring 2 by sliding off the retaining pin barb 16.

Figure 20:
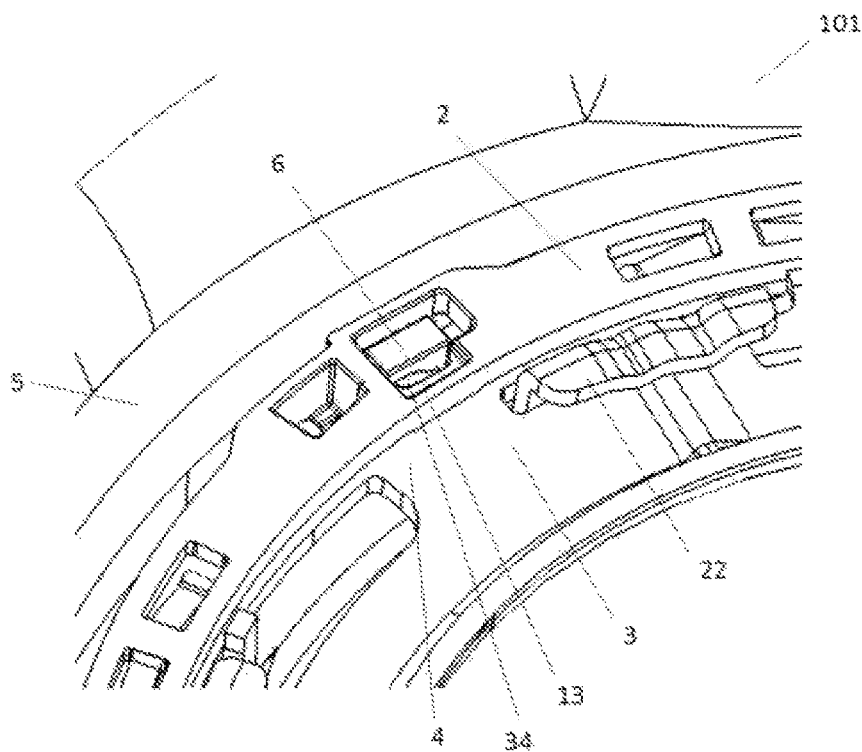
FIG. 20 shows a partial detailed section of the fuel pump cover ring attached to the lock ring in the locked position.

As shown in FIG. 20, with the flexible cover 1 removed from the fuel pump cover ring 2, a screwdriver or any thin flat tool can be used to unlock the snap lock retainer 6 on the fuel pump cover ring 2. For this purpose, it is required to insert the tip of the tool into the removal port 13 in the fuel pump cover ring 2, and to place it on the flat surface 34 of the snap lock retainer 6. With the tool in place, light rotational pressure in the unlocking direction is applied to the fuel pump cover ring 2 while pressing down on the back of the tool to apply pressure to the flat surface 34 of the snap lock retainer 6, which in turn lifts the surface 33 of the snap lock retainer 6 out of the cam lock ring outer slot 17.

Lifting the bottom surface 31 of the snap lock retainer 6 up to an equal level with the top surface 19 of the lock ring 3 will release the snap lock retainer 6 from the lock ring outer slot 17 to allow the fuel pump cover ring 2 to rotate free. Then, the fuel pump cover ring 2 is rotated until the unlocked position indicator 14 is aligned to the position indicator 26 on the fuel tank 5. The fuel pump cover ring 2 can then be removed from the lock ring 3, giving service access to the lock ring 3 and the fuel pump assembly 4.

While only selected embodiments have been chosen to illustrate the present invention, it will be apparent to those skilled in the art from this disclosure that various changes and modifications can be made herein departing from the scope of the invention as defined in the appending claims. For example, the size, shape, location or orientation of the various components can be changed as needed. It is not necessary for all advantages to be present in a particular embodiment at the same time. Thus, the foregoing descriptions of the embodiments according to the present invention are provided for illustration only, and not for the purpose of limiting as defined by the appended claims and their equivalents.

What is claimed is:

1. A fuel pump cover apparatus, comprising:
   a fuel pump assembly configured to be attached to a fuel tank,
   a lock ring disposed on the fuel pump assembly configured to fix the fuel pump assembly to the fuel tank and having a plurality of slots,
   a cover ring placed over the lock ring and having a plurality of clipping devices disposed under the cover ring to be attached to the slots of the lock ring, and a plurality of spring retainers disposed under the cover ring to apply pressure between the cover ring and the fuel pump assembly,
   a cover disposed over the cover ring to cover the fuel pump assembly, and
   a plurality of retaining members arranged between the cover and the cover ring to removably attach the cover to the cover ring.

2. A fuel pump cover apparatus according to claim 1, wherein each of the plurality of retaining members includes a retaining pin projecting from an upper surface of the cover ring, and a hole formed in the cover to removably receive the retaining pin.

3. A fuel pump cover apparatus according to claim 1, wherein each of the clipping devices includes a lock retainer engaging each of edge lips of the lock ring to engage the cover ring with the lock ring.

4. A fuel pump cover apparatus according to claim 3, wherein the cover ring further includes access ports to release the plurality of clipping devices from the lock ring.

5. A fuel pump cover apparatus according to claim 3, wherein the cover ring further includes a plurality of retainer guides disposed under the cover ring, each having a guide angle that compresses each of the spring retainers during installation.

6. A fuel pump cover apparatus according to claim 1, wherein the cover ring further includes a position indicator that shows whether the cover ring is rotationally locked or unlocked to a securing member that retains the fuel pump assembly.

\* \* \* \* \*